United States Patent [19]

Chervenka, Jr. et al.

[11] 3,997,353
[45] Dec. 14, 1976

[54] HIGH EARLY STRENGTH CEMENT

[75] Inventors: James Chervenka, Jr., Kingsville, Tex.; Raymond P. Heilich, Mehlville, Mo.

[73] Assignee: Aluminum Company of America, Pittsburgh, Pa.

[22] Filed: Aug. 8, 1975

[21] Appl. No.: 603,011

Related U.S. Application Data

[63] Continuation-in-part of Ser. No. 515,909, Oct. 18, 1974, abandoned.

[52] U.S. Cl. .................... 106/89; 106/90; 106/104; 106/109; 106/98; 106/110
[51] Int. Cl.² ............. C04B 7/02; C04B 7/32; C04B 11/00
[58] Field of Search .............. 106/89, 90, 104, 109, 106/110

[56] References Cited

UNITED STATES PATENTS

| | | | |
|---|---|---|---|
| 3,251,701 | 5/1966 | Klein | 106/89 |
| 3,645,750 | 2/1972 | Sadran | 106/104 |
| 3,782,984 | 1/1974 | Allemand | 106/90 |
| 3,860,433 | 1/1975 | Ost et al. | 106/89 |
| 3,861,929 | 1/1975 | Deets et al. | 106/89 |

FOREIGN PATENTS OR APPLICATIONS

| | | | |
|---|---|---|---|
| 1,377,203 | 9/1964 | France | 106/104 |

*Primary Examiner*—Helen M. McCarthy
*Attorney, Agent, or Firm*—John P. Taylor

[57] ABSTRACT

A high early strength cement composition is disclosed which is capable of providing sufficient compressive strength within 2 to 24 hours to enable one to use it in highway or airport runway patching. The cement also exhibits satisfactory ultimate strength, that is, strength after 28 or more days of curing. The high early strength cement comprises a mixture of portland cement, calcium aluminate, and calcium sulfate in certain specified proportions.

11 Claims, 1 Drawing Figure

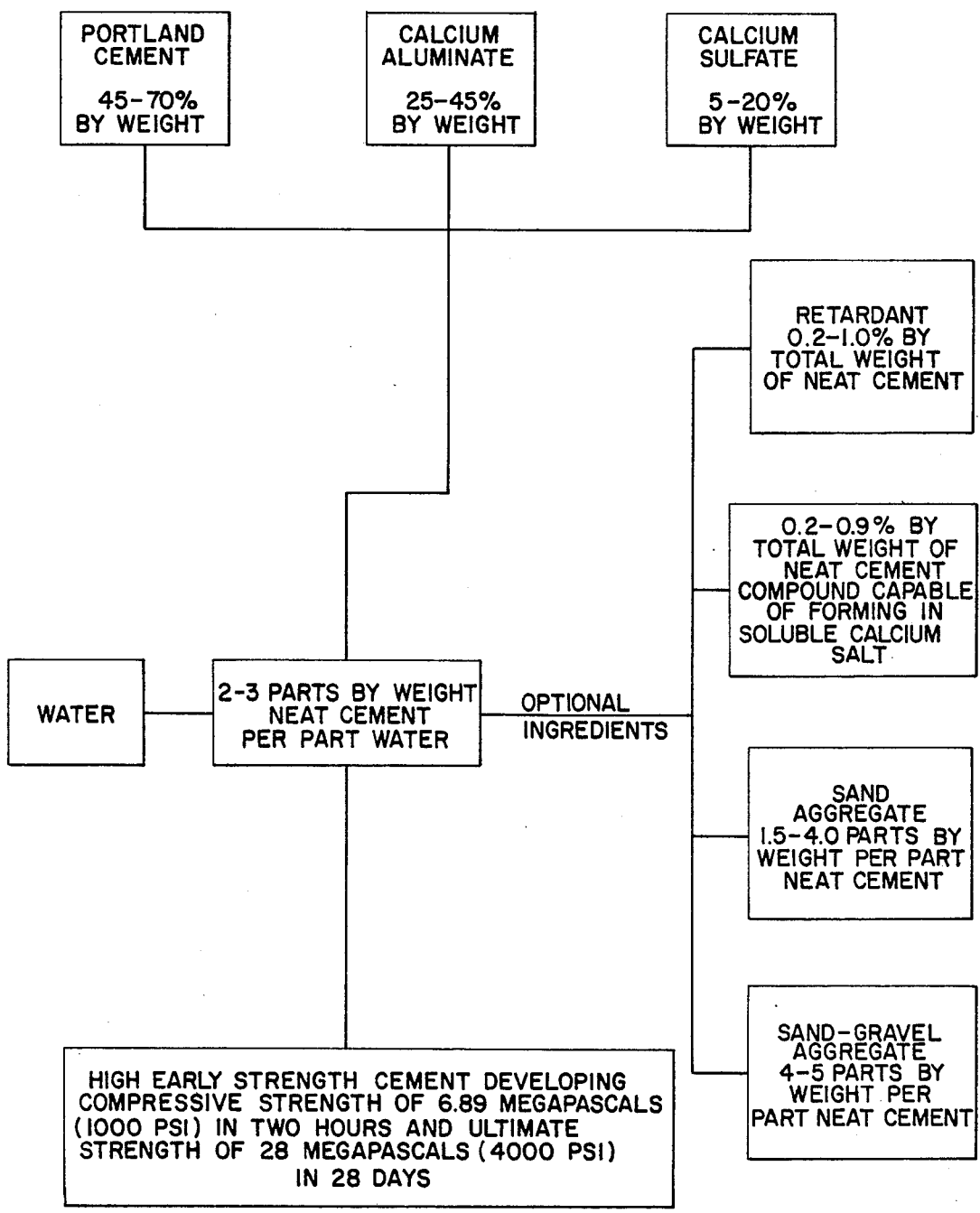

HIGH EARLY STRENGTH CEMENT

CROSS-REFERENCE TO RELATED APPLICATIONS

This application is a continuation-in-part of U.S. patent application Ser. No. 515,909, filed Oct. 18, 1974, now abandoned.

BACKGROUND OF THE INVENTION

This invention relates to cement and more particularly to a cement having high early strength characteristics.

The use of mixtures of portland cements and aluminous cements to provide a cement mixture which exhibits high early strength is known. However, such mixtures in comparison to portland cement or aluminous cement alone, characteristically exhibit reduced ultimate strength as well as a tendency over a wide range of composition to flash set.

It is also known to add calcium sulfate to portland-aluminous cement mixture. Spackman et al. U.S. Pat. No. 903,019 states that the addition of 1–3% calcium sulfate to a portland cement containing calcium aluminate acts as a controlling agent — apparently to control setting time. Such mixtures have also been used to provide cements which expand upon setting. For example, Schenker et al. U.S. Pat. No. 2,465,278 adds a mixture of calcium hydrate [$Ca(OH)_2$], calcium sulfate, and an aluminous compound to a portland cement mixture to impart expansive properties thereto. While such cements exhibit certain advantages in the casting of reinforced structures or when prestressing is desired they are not always suitable for use in patching type operations such as, for example, on a highway, because of the expansion which can cause buckling. In addition, such cements are not usually known to possess high strength, suffering either from a lower early strength or a somewhat lower subsequent strength. Thus, for example in Klein U.S. Pat. No. 3,155,526 and Klein U.S. Pat. No. 3,251,701, suitable data is offered with regard to the expansion characteristics of a resultant cement but very little is said regarding the strength of the cement. H. Lafuma, in a paper entitled "Expansive Cements", published in the Proceedings of the 3rd International Symposium on Chemistry of Cement (1952) indicates (on page 584) that combinations of high alumina cement and calcium sulfate with portland cement produce "remarkable strengths at early ages". However, Lafuma does not indicate what level of strength is reached at what period of time nor what ratios one should use to achieve such results, since he appears to prefer the use of a clinker which contains calcium silicate as well as calcium aluminate and calcium sulfate. Lafuma further mentions (on page 585) that the composition of non-shrinking cements is very similar to that of expensive cements and presents data showing the amount of $SO_3$ and sulpho-aluminate necessary to provide the expansion that he desires. However, Lafuma does not indicate how one may obtain a dimensionally stable (non-expansive) cement which will exhibit high early strength as well.

It is also known to combine tricalcium silicate (one of the ingredients in portland cement) with calcium aluminate and calcium sulfate. Sadran U.S. Pat. No. 3,645,750 describes such a mixture and states that it has good early strength without quantifying either the time or degree of strength. Furthermore, Sadran indicates that his basic binary composition of tricalcium silicate and aluminous cement attained its peak strength more gradually and actually showed a lower strength for the first 24 hours than reference aluminous cements.

The use of sulfo-aluminate cements — without portland cement — is also known. Armstrong et al. U.S. Pat. No. 3,147,129 describes such cements and states that they do not appear to give very high early strengths as opposed to ordinary aluminous cement. Armstrong et al. propose the addition of fluorine to the sulfo-aluminate cement to obtain higher strength. However, the main use of such blends still appears to be to obtain an over-all expansion property of the cement.

There remains, however, a need for a cementitious mixture which will be substantially neither expansive nor exhibit shrinkage and which may be used to provide a product exhibiting high early strength as well as sufficient ultimate strength. Such a product, for example, can be used in the patching of highways, particularly main arteries such as Interstate highways or turnpikes which cannot be closed for long periods of time sufficient to permit ordinary concrete to develop satisfactory ultimate strength such as, for example, 28 days. Similarly, the patching of airport runways necessitates the use of a cementitious material which will exhibit sufficient high early strength to permit the use of the runway within a short period of time after the patching without, however, sacrificing the ultimate strengths obtainable with ordinary cements.

SUMMARY OF THE INVENTION

In accordance with the invention it has now been discovered that a particular ratio of portland cement to calcium aluminate and calcium sulfate will result in a cementitious material which, by itself or mixed with aggregates such as sand and gravel or the like, will produce a cement exhibiting neither substantial expansive nor shrinkage characteristics and exhibiting high early strength; that is, high strength in 2 hours to 1 day's time yet also developing satisfactory ultimate strength; that is, strength after 28 days or more of curing.

The cementitious mixture of the invention comprises approximately 45 to 70% by weight and preferably 50 to 60% by weight portland cement, approximately 25 to 45% by weight and preferably 30 to 40% by weight calcium aluminate, and approximately 5 to 20% by weight and preferably 5 to 18% and most preferably 7 to 15% by weight calcium sulfate.

BRIEF DESCRIPTION OF THE DRAWING

The sole drawing of the invention comprises a flowsheet which illustrates the mixtures of materials comprising the invention.

DESCRIPTION OF THE INVENTION

In accordance with the invention, a high early strength cement is provided comprising portland cement, calcium aluminate, and calcium sulfate in a predetermined mixture or ratio which provides a final product which not only exhibits high early strength and satisfactory subsequent or ultimate strength, but provides substantially neither shrinkage nor expansion of the cementitious product.

The term "high early strength" as used in the cement industry refers to a compressive strength of about 1700 to 3500 psi developed by portland cements in about 24 hours as opposed to its ultimate strength developed after 28 days. Tests to determine such high early strength are made according to ASTM Standard C-109. Such cements characteristically develop little if any strength (200 psi or less) within the first 6 to 8 hours.

In contrast, the cement composition of this invention develops significant strength in only 2 hours. The use of the term high early strength in this specification is therefore defined as a compressive strength of at least about 1000 psi (6.89 mega Pascals) and preferably about 1500 psi (10.34 mega Pascals) developed in 2 hours or less when tested in accordance with ASTM Standard C-109. It is another characteristic of the high early cement of the invention as that term is used herein, that the cement continues to develop compressive strength to reach a compressive strength within the first 24 hours of at least about 3000 psi (20.7 mega Pascals) thus rendering it favorably comparable at this point in time with conventional high early strength cements.

It is a further characteristic of the cement composition of the invention that it also develops satisfactory "ultimate strength". Ultimate strength conventionally is a measurement of the compressive strength of a cement after 28 days. A typical Type III portland cement develops an ultimate strength in 28 days of about 6000 to 7500 psi (41 to 52 mega Pascals). A typical Type I portland cement develops an ultimate strength of 5500 to 6500 psi and is specified by ASTM standards to be at least 3500 psi. Therefore, a sufficient or satisfactory ultimate strength is defined herein as a compressive strength in 28 days of at least about 4000 psi (28 mega Pascals.

As previously referred to above, previous uses of calcium sulfate in aluminous-portland cement mixtures have been to impart expansive properties to the cement. In accordance with the invention, the cement composition described and claimed herein does not exhibit substantial expansive properties, yet does not exhibit the shrinkage normally found in portland cements. The absence of either expansive or shrinkage characteristics is defined herein as a linear dimension change of not greater than about −0.05 to +0.2% and, when the preferred compositional ranges are utilized, not greater than about −0.05 to +0.1%.

The term "portland cement" as used herein is intended to define a cementitious material containing 28–63% by weight tricalcium silicate, 10–49% by weight dicalcium silicate, 1–14% by weight tricalcium aluminate, 4–15% by weight tetracalcium aluminoferrite, and not more than 2% by weight free calcium oxide. Portland cements of types I-V falling in these ranges can be found on page 160 of F. M. Lea's "The Chemistry of Cement and Concrete" published in 1971 by the Chemical Publishing Company, Inc. of New York and on page 9 of the Tenth Edition of "Design and Control of Concrete Mixtures" published by the Portland Cement Association in 1952. Such portland cements also contain minor amouts of other ingredients such as MgO, TiO$_2$, Na$_2$O, K$_2$O, and SO$_3$ but the presence of these ingredients has not been found to have any effect on the composition of the invention in the amounts normally encountered in such conventional portland cements. As will be described further, the total amount of calcium aluminate which is to be added will vary somewhat with regard to the total amount of calcium aluminate present in the portland cement component of the mixture. The amount of portland cement used comprises from 45 to 70% by weight of the portland-cement aluminate-calcium sulfate mixture. Preferably the amount is from about 50 to 60% by weight.

The portland cement useful in the invention is further characterized by the total amount of tricalcium silicate present therein and the ratio of tricalcium silicate to dicalcium silicate. This is due to the deleterious effect of the presence of free lime in an amount greater than 2% by weight of the portland cement in the cement mixture of the invention. An excesssive amount of tricalcium silicate in the portland cement can result in regeneration of free lime upon hydrolysis. Furthermore, high tricalcium silicate content portland cement sometimes contains unreacted lime from the initial formation of the tricalcium silicate by the cement manufacturer. Therefore, in accordance with the invention, the amount of tricalcium silicate in the portland cement preferably should generally not exceed about 50% by weight of the portland cement and the stoichiometric ratio of tricalcium silicate to dicalcium silicate should not exceed about 2.

Alternatively, if the amounts discussed above are exceeded, it has been found that the addition of a compound which will form an insoluble calcium salt will counter the deleterious effects of the free lime. Normally an amount of from 0.2 to 0.9% by weight will be sufficient. Higher amounts can be used if necessary. Examples of such additives include carbonates such as potassium carbonate, sodium carbonate, sodium bicarbonate and ammonium carbonate.

The calcium aluminate added to the portland cement in accordance with the invention comprises CaO(C) and Al$_2$O$_3$(A) in a stoichiometric ratio of one part C to 0.58 to 2.5 parts A. The total amount of calcium aluminate used in making the high early strength cement of the invention is the sum of the calcium aluminate added to the portland cement plus the amount of tricalcium aluminate present in the particular portland cement used. This total amount ranges from about 35–55% by weight of the total cement mixture (portland cement, calcium aluminate, calcium sulfate). Usually this can be achieved by adding an amount of calcium aluminate equal to about 25–45% and preferably 30–40% by weight of the total cement mixture. The 30–40% range is preferred since it will then usually not be necessary to predetermine the amount of tricalcium aluminate already present in the portland cement since the total of 55% by weight will not be exceeded. The sum of the amounts of added calcium aluminate and calcium sulfate should not exceed 55% by weight of the total mixture to avoid excessive loss of ultimate strength.

Furthermore, it has been found that low amounts of calcium aluminate can result in an unsatisfactory final product if the amount of calcium sulfate is high. While this effect is not completely understood, it is thought that this results from a slower reaction or setting rate permitting an unacceptable amount of expansion due to the calcium sulfate component. Therefore, for each 1% increment that the amount of added calcium aluminate is less than 35% by weight the calcium sulfate should be reduced by an equal amount so that the resulting maximum allowable calcium sulfate content is approximately 10% in a mix containing 25% of the added calcium aluminate component. This represents an increase in the minimum allowable ratio of calcium aluminate to calcium sulfate from approximately 1.75 at the 35% added calcium aluminate level to approximately 2.5 at the 25% added calcium aluminate level.

While the calcium aluminate is expressed in terms of stoichiometric ratios of CaO and $Al_2O_3$, it should be pointed out that the calcium aluminate used is a burned or reacted compound characterized by an absence of free lime [CaO or $Ca(OH)_2$], i.e. less than 0.2% by weight. This substantial absence of free lime, as previously discussed, has been found necessary to achieve the desired results of the invention.

The calcium aluminate should be in the form of ground particles ground finer than 80% minus 44 microns (−325 mesh). The particles should have a median particle size of about 10 to 20 microns as determined by a Coulter counter. The use of the calcium aluminate in this form provides better particle packing, lower porosity and lower water content thus providing higher strength in the resulting cement product. It has been found that very fine particles cause flash setting of the cement while the use of coarse particles can result in undesirable expansion. While these problems can be controlled to some extent (thus permitting the range of particle size recited) by the use of a retardant as will be discussed below, excessive amounts of such additives can result in lower ultimate strength and thus are to be avoided or minimized.

The third component, calcium sulfate, may be used in either the anhydrite, hemi-hydrate, or dihydrate form. Preferably, the calcium sulfate is ground to a 99% or greater minus 149 microns (−100 mesh) particle size. The amount of calcium sulfate used (expressed as $CaSO_4 \cdot \frac{1}{2}H_2O$) should be at least about 5% and most preferably 7% by weight of the three-component mixture to provide sufficient early strength but not greater than 20% and preferably 18%, and most preferably 15% to prevent undesirable expansion of the cement mixture. For reasons not entirely understood amounts between 18–20% can be operative or inoperative, apparently depending upon the chemistry of the portland cement or the calcium aluminate. Obviously, the range will vary slightly when the anhydrite or dihydrate forms are used.

In a preferred embodiment of the invention, the three primary ingredients may be blended together with an additional fourth ingredient which provides somewhat of a retardation of the setting time of the cement. The use of such an additive will inhibit flash setting when the particle size of the other ingredients is very small. However, as cautioned above, the use of such a fourth ingredient must be limited because of the undesirable lessening of ultimate strength if excessive amounts of retardant are used. Thus, the use of such a fourth ingredient cannot be used as a substitute for particle size control, but is rather to be used judiciously as a supplement to particle size control.

The amount of the retardant used should therefore be in the range of about 0.2 to 1.0% by total weight of the cement mixture. Typical of useful retardant are materials such as sodium citrate or other soluble salts of organic acids such as aryl alkyl sulfonic acid sodium salts. Examples of such materials are the DAXAD dispersing agents available from W. R. Grace & Co.

The cement mixture can be used as a neat cement or with ordinary aggregates such as sand or sand-gravel mixtures in ratios of as high as one part cement to nine parts aggregate (1:9). Preferably, however, the ratio of cement to a sand aggregate (mortar) is from about 1:1.5 to 1:4.0 and most preferably about 1:2.3 to 1:4.0 and the cement to a sand-gravel aggregate (concrete) is about 1:4 to 1:5.

The cement-water ratios used with the mixture vary from about 2:1 to 3:1 parts by weight neat cement to parts by weight water.

In accordance with the invention, the portland cement-calcium aluminate-calcium sulfate mixture, when mixed with water and aggregate in the ratios discussed, provides a hydraulic cement which sets in about 2 hours to a compressive strength of at least about 1000 psi (6.89 mega Pascals) and preferably about 1500 psi (10.34 mega Pascals) and a strength of at least about 3000 psi (20.67 mega Pascals) within 24 hours.

EXAMPLE I

To further illustrate the practice of the invention, a mixture of 55% by weight Type III portland cement, 35% by weight calcium aluminate clinker and about 10% by weight plaster ($CaSO_4 \cdot \frac{1}{2}H_2O$) were mixed with 0.75% by weight of a DAXAD dispersing agent. The cement was mixed in various proportions respectively with sand and a sand-gravel mixture as tabulated below and then mixed with water and allowed to cure. The average compressive strength in mega Pascals (Newtons per square meter times $10^{-6}$) was measured at 1 hour, 2 hours, 24 hours and after 28 days. In each instance the cement was cured at 23° C for the first 24 hours at 95% relative humidity and then cured for the next 27 days in water at 23° C. The results are tabulated in Table I below.

TABLE I

| Cement/ Aggregate Ratio | Type of Aggregate | Water/ Cement Ratio | Average Compressive Strength- Time after Placing ($N/m^2 \cdot 10^{-6}$) | | | |
|---|---|---|---|---|---|---|
| | | | 1 hr. | 2 hrs. | 24 hrs. | 28 Days |
| 1:2.75 | Ottawa ASTM C109 Sand | 0.450 | 2.7 | 14.5 | 21.9 | 33.1 |
| 2:3 | Ottawa ASTM C109 Sand | 0.350 | 3.9 | 20.9 | 38.9 | 56.3 |
| 1:2.75 | Sand/Gravel | 0.375 | 3.0 | 19.9 | 33.7 | 47.8 |

The shrinkage-expansion characteristics were also measured and found to be within the range of 0.05% shrinkage to 0.10% expansion.

EXAMPLE II

To illustrate the requirement that at least about 30% by weight be a combination of added calcium aluminate and calcium sulfate to provide sufficient early strength, i.e. the portland cement component should not exceed about 70%, two cement mixtures were made up as follows in % by weight.

| | Portland (Type I) | Calcium Aluminate | Plaster ($CaSO_4 \cdot \frac{1}{2}H_2O$) |
|---|---|---|---|
| A | 75 | 19½ | 5½ |
| B | 65 | 27 | 8 |

0.2% and 0.3% by total weight sodium citrate was added respectively to Samples A and B as retardant.

Each sample was then mixed with water and sand in a ratio (in parts by weight) of 26 parts cement, 74 parts sand, and 11 parts water. The samples were then allowed to set and the compressive strength measured and tabulated as follows:

TABLE II

| | Compressive Strength (mega Pascals) | | |
|---|---|---|---|
| | 2 hrs. | 24 hrs. | 28 days |
| Sample A | 0.55 (80 psi) | 2.16 | 31.7 |
| Sample B | 12.3 (1800 psi) | 23.1 | 30.5 |

The results indicate that Sample A (containing only 25% by combined weight calcium aluminate and calcium sulfate) developed very little high early strength, i.e. in 2 hours, while Sample B (containing 35% by combined weight calcium aluminate and calcium sulfate) developed a very satisfactory compressive strength in the same period of time.

EXAMPLE III

To illustrate the criticality of the amount of calcium sulfate (plaster) used, comparative tests were run respectively using 3% by weight, over 20% by weight and an amount within the specified range of 5 to 20%.

To each sample mixture was added 0.4% sodium citrate as retardant. One part by weight cement was then mixed with 2.75 parts by weight sand and 0.45 parts by weight water. The samples were then allowed to set and the compressive strength (in mega Pascals) measured. The constituents and test results for each sample are tabulated as follows:

EXAMPLE IV

To illustrate the effects of free lime [Ca(OH)$_2$] and excessive amounts of tricalcium silicate in the composition as well as the effect of sodium carbonate, a series of samples were prepared using (in weight %) 55% portland cement, 35% calcium aluminate, 10% calcium sulfate and 0.4% (of the total neat cement) sodium citrate. This cement mixture was then mixed with sand and water in a ratio of 1 part cements:2.75 parts sand:0.48 parts water at 23° C. The amounts of the calcium silicates, free lime, sodium carbonate and the test results are tabulated below:

TABLE IV

| Sample | C$_3$S* Content (% wt) | C$_3$S/C$_2$S Ratio** | Na$_2$CO$_3$ (% wt) | CaO (% wt) | Compressive Strength | | |
|---|---|---|---|---|---|---|---|
| | | | | | 2 hrs. | 1 day | 28 days |
| F | 41.8 | 1.34 | — | — | 9.65 (1400) | 23.1 (3350) | 30.6 MPa (4440) (psi) |
| G | 52.3 | 2.25 | — | — | 0.90 (130) | 19.8 (2870) | 30.9 MPa (4480) (psi) |
| H | 41.8 | 1.34 | 0.2 | — | 9.05 (1310) | 22.8 (3310) | 29.4 MPa (4265) (psi) |
| I | 52.3 | 2.25 | 0.2 | — | 13.3 (1930) | 20.9 (3030) | 29.5 MPa (4280) (psi) |
| J | 41.8 | 1.34 | — | 3.5 | 0.43 (60) | 14.9 (2160) | 24.8 MPa (3600) (psi) |

*C$_3$S = tricalcium silicate
**C$_2$S = dicalcium silicate

The results indicate the deleterious effects of excessive tricalcium silicate or free lime on the early strength of the cements as well as the beneficial effect of sodium carbonate on a formulation containing an excessive amount of tricalcium silicate. The same results have been obtained when using sodium carbonate in the presence of added free lime such as shown for Sample J.

EXAMPLE V

To illustrate the use of portland cement rather than tricalcium silicate in the composition of the invention, two samples were prepared using in each case 35% by weight calcium aluminate, and 10% by weight calcium sulfate hemihydrate. One sample contained 55% by weight Atlas type III portland cement while the other sample contained 55% by weight of a greater than 90% tricalcium silicate compound containing 1.2% free CaO. This tricalcium silicate was prepared by firing a good quality Rangaire limestone with a high purity potters flint for 5 hours at 1500° C to provide good conversion with respect to free CaO and tricalcium silicate.

TABLE III

| | Compressive Strength in Mega Pascals | | | Expansion in 24 hrs. | Portland | Calcium Aluminate | Calcium Sulfate |
|---|---|---|---|---|---|---|---|
| | 2 hrs. | 24 hrs. | 28 days | | | | |
| Sample C | 4.48 (650 psi) | 14.5 | 23.4 | 0.06 | 62 | 35 | 3 |
| Sample D | 4.83 (700 psi) | 9.57 | * | 1.27 | 40 | 35 | 25 |
| Sample E | 13.2 (1915 psi) | 24.6 | 33.8 | 0.03 | 55 | 35 | 10 |

*No 28-day strength measurement made - because sample disintegrated due to excessive expansion.

The results indicate the superior early strength, ultimate strength and expansion-shrinkage characteristics of the cement made in the specified range in accordance with the invention.

The respective mixes were each mixed with sand in a ratio of 1 part by weight cement mix to 2.75 parts sand, then mixed with water to the same consistency and then allowed to cure.

The compressive strength of the samples was measured at 2 hours, 6 hours, and 24 hours of cure time as follows:

TABLE V

| Sample Containing Portland Cement Compressive Strength (in psi) | | |
| --- | --- | --- |
| 2 hrs. | 6 hrs. | 24 hrs. |
| 1100 | 2138 | 3288 |
| Sample Containing Tricalcium Silicate Compressive Strength (in psi) | | |
| 2 hrs. | 6 hrs. | 24 hrs. |
| 75 | 188 | 1375 (sample showed cracking) |

The results clearly indicate the superior early strength of the composition of the invention using portland cement in contrast to substitution of tricalcium silicate. While it is not clearly understood why this difference occurs, it is possible that the use of the tricalcium silicate results in the regeneration of an excessive amount of free lime which has been found to be deleterious in the ternary mixture of the invention.

What is claimed is:

1. A cementitious mixture capable of curing to exhibit both high early strength and good ultimate strength and containing as essential ingredients:
   45 to 70% by weight portland cement;
   25 to 45% by weight calcium aluminate;
   5 to 20% by weight calcium sulfate;
   said cementitious mixture being further characterized by a dimensional stability upon curing of less than about 0.05% shrinkage and less than about 0.2% expansion.

2. The cementitious mixture of claim 1 wherein the combined amount of calcium aluminate and calcium sulfate is from 30 to 55% by weight of the three components.

3. The cementitious mixture of claim 2 wherein the calcium aluminate is further characterized by a stoichiometric ratio of CaO to $Al_2O_3$ of 1 part CaO to 0.58 to 2.5 parts $Al_2O_3$ and a substantial absence of free lime.

4. The cementitious mixture of claim 1 wherein its mixture with from 1.5 to 4 parts aggregate per part of cement and 0.33 to 0.5 parts water will yield an early compressive strength in 2 hours of at least 6.89 mega Pascals and an ultimate compressive strength in 28 days of at least 28 mega Pascals.

5. The cementitious mixture of claim 1 wherein said mixture further contains from 0.2 to 0.9% of a compound capable of reacting with free lime to form an insoluble calcium salt.

6. The mixture of claim 5 wherein said compound is a soluble carbonate.

7. The cementitious mixture of claim 1 wherein said mixture further contains from 0.2 to 1.0% of an agent for retardation of the setting time of the cement.

8. The cementitious mixture of claim 1 wherein the ratio of calcium aluminate to calcium sulfate is sufficiently over 1.75:1 when the total amount of calcium aluminate is less than 35% to prevent excessive expansion.

9. The cementitious mixture of claim 8 wherein any reduction in the amount of calcium aluminate below 35% is accompanied by an equal reduction in the amount of calcium sulfate below 20%.

10. A cementitious mixture capable of curing to high early strength of at least about 6.89 mega Pascals in 2 hours and an ultimate strength of at least 28 mega Pascals in 28 days with a dimensional stability of less than about 0.05% shrinkage and less than about 0.2% expansion containing as essential ingredients: 50 to 60% by weight of a portland cement containing 28–63% by weight tricalcium silicate, 10–49% by weight dicalcium silicate, 1–14% by weight tricalcium aluminate, 4–15% by weight tetracalcium aluminoferrite, and not more than 2% by weight free calcium oxide; 30 to 40% by weight calcium aluminate; 7 to 15% by weight calcium sulfate; and 0.2 to 1.0% by weight of a retardant selected from the class consisting of soluble salts of organic acids.

11. The cementitious mixture of claim 10 wherein the tricalcium silicate in said portland cement does not exceed 50% by weight of the portland cement and the stoichiometric ratio of the tricalcium silicate to dicalcium silicate does not exceed 2.

* * * * *